3,066,124
TREATMENT OF POLYMERS
Robert Gilmour Jamieson Telfer, Norton-on-Tees, England, assignor to Imperial Chemical Industries Limited, London, England, a corporation of Great Britain
No Drawing. Filed Mar. 31, 1958, Ser. No. 724,849
Claims priority, application Great Britain Apr. 18, 1957
16 Claims. (Cl. 260—93.7)

This invention relates to the treatment of polymers.

Processes have been described for the polymerisation of unsaturated hydrocarbons to high molecular weight solid polymers in the presence of a metal-containing catalyst. Such a metal-containing catalyst may be formed by reacting a transition metal compound such as for example, titanium tetrachloride, titanium trichloride or vanadium tetrachloride with an organo-metal compound such as an aluminium alkyl, an alkyl aluminium halide, a complex alkyl of an alkali metal and aluminium, e.g. lithium aluminium tetraethyl or an alkali metal alkyl. These polymerisation processes may be carried out in the presence of an inert solvent such as a hydrocarbon, or in the presence of an excess amount of the unsaturated hydrocarbon in the liquid phase and in the term solvent as used hereinafter we include excess or unreacted unsaturated hydrocarbon.

Examples of particularly valuable solid polymers produced by these processes are polyethylene and polypropylene especially the so-called isotactic (crystalline) polypropylene.

The crude product of these processes is solid polymer with occluded metal-containing catalyst residues. The crude product is usually in the form of a slurry in an inert solvent or excess of the unsaturated hydrocarbon. The solvent may contain atactic (amorphous) polymer in solution.

It is very desirable to remove these metal-containing catalyst residues from the polymer otherwise the polymer may be discoloured and may undergo decomposition particularly under the action of heat.

It has already been proposed to remove these residues from the polymer by treating and washing the polymer with large quantities of a lower alcohol.

We have now found that higher alcohols are very suitable for removing metal-containing catalyst residues from polymers of unsaturated hydrocarbons, and that their use has a number of important advantages over the known processes which use lower alcohols. For instance, only relatively small amounts of a higher alcohol are necessary and recovery of the alcohol is facilitated.

According to the present invention there is provided a process for removing metal-containing catalyst residues from solid polymers of unsaturated hydrocarbons which comprises treating the polymer with a higher alcohol in the presence of a solvent, separating the solid polymer from the solvent and recovering solid polymer.

It is preferred that the higher alcohol is one containing at least nine carbon atoms in the molecule for example, nonanols, decanols and dodecanols. Because of its ready availability a very suitable higher alcohol is 3,5,5-trimethylhexanol-1.

Extensive oxidation of the metal-containing residues in the polymer before treatment with the higher alcohol must be avoided and it is, therefore, preferred to restrict the contact of the polymer with air as much as possible until the treatment with the higher alcohol is completed. However, the polymer may be stored in closed containers in the presence of small amounts of air prior to treatment with the higher alcohol. It is preferred to carry out the process of the invention in the absence of air.

It is preferred that the solvent is a hydrocarbon in which metal-containing residues after treatment with the higher alcohol are soluble. The hydrocarbon may be an inert hydrocarbon used as a solvent in the polymerisation process or it may be the unsaturated hydrocarbon monomer which has been subjected to the polymerisation process.

The higher alcohol may be added to the polymerisation product comprising the solvent and/or unreacted unsaturated hydrocarbon, further solvent being added as necessary or the solid polymer may be separated from the reaction product of the polymerisation process and then slurried in fresh solvent.

Particularly suitable solvents are paraffin hydrocarbons such as propane, butane, pentane and higher paraffin hydrocarbons. The corresponding olefines such as propylene may be used also. It will be appreciated that the solvent should be in the liquid phase and that if the solvent is gaseous under normal conditions sufficient pressure should be applied to liquefy it.

The amount of higher alcohol used depends upon the amount of metal-containing catalyst residues in the polymer. Hence the amount of higher alcohol may be varied over a wide range. It is usually sufficient to use between 15% and 50% by weight of alcohol referred to the weight of the polymer insoluble in the solvent. However, if the amount of metal containing residue is low, less than 15%, for example 5%, by weight of the alcohol may be used.

If it is desired to recover the polymer in the isotactic form it is particularly desirable to use the minimum amount of alcohol necessary to effect removal of the metal-containing catalyst residues in order to minimise or avoid precipitation of atactic polymer from solution in the solvent.

It is a particular further feature of the invention to carry out the treatment with the higher alcohol in the presence of an aluminium halide or an aluminium alkyl halide.

It is preferred that the halide is soluble in the solvent. Examples of suitable halides are thus aluminium bromide and aluminium alkyl halides such as ethyl aluminium dichloride and ethyl aluminium sesquichloride. It is preferred to use an aluminium alkyl halide.

Aluminium chloride may be used but since it is only slightly soluble in hydrocarbons it is desirable to use it as a solution in, for example, ether.

Suitable amounts of the aluminium halide or aluminium alkyl halide are up to 10% by weight of the polymer insoluble in the solvent. It is preferred to use between 2.5% and 5% by weight of the insoluble polymer.

The aluminium halide or alkyl aluminium halide should preferably be added to the mixture of polymer and solvent prior to the addition of the higher alcohol. The halide may be added as a finely divided suspension or preferably as a solution in the solvent.

It is preferred that the treatment with the higher alcohol is carried out at a temperature of at least 70° C. Very suitable temperatures are within the range 70° to 80° C.

The process of the invention is applicable to the removal of metal-containing catalyst residues from polymers of unsaturated hydrocarbons such as polyethylene and polypropylene produced in the presence of a catalyst formed by reacting a titanium compound such as titanium tetrachloride or titanium trichloride with an organo-compound of aluminium e.g. an aluminium alkyl or produced by the process of co-pending U.S. application Serial No. 703,732, dated December 19, 1957.

After treatment with the higher alcohol the solid polymer is separated for example, by filtration, from the liquid components of the mixture and washed with a hydrocarbon which is preferably the hydrocarbon used as a solvent and very suitably a low boiling hydrocarbon such as propane or propylene. This washing process may be carried out in stages and the hydrocarbon used as a washing liquid in the first stages may contain a small amount of a higher alcohol. However, it is preferred particularly in the final stage of the washing process to use a hydrocarbon free from alcohol. By washing the separated polymer with a hydrocarbon, precipitation of atactic polymer from solution in the solvent adhering to the polymer, such as may occur if the washing agent is an alcohol, is prevented. Substantially complete removal of any remaining metal residues and alcohol is also effected. Removal of residual alcohol is very desirable since otherwise it may cause cavitation in the polymer when the latter is subjected to heat treatment.

It is preferred to subject the polymer finally to treatment with steam to remove the last traces of solvent.

Example 1

30 ml. 3,5,5-trimethylhexanol-1 were added to 800 ml. of a crude suspension of polypropylene in petroleum ether obtained by polymerising propylene in the presence of the reaction product of titanium trichloride and aluminium triethyl. The mixture was then stirred and heated at about 75° C. under reflux for 1 hour by which time the original lilac colour of the mixture was discharged. The resulting white slurry was filtered and washed thoroughly with 1 litre petroleum ether (boiling range 60° to 80° C.). About 50 gm. of polymer were obtained, having an ash content of 0.03% melting to a clear white melt. All operations up to the final washing of the polymer were conducted under an air-and moisture-free atmosphere. The combined filtrates from the above operations contained almost all the atactic polymer originally present in the crude polymer.

When the above experiment was repeated in the absence of 3,5,5-trimethylhexanol-1 the final polymer had an ash content of 1.5% and melted to a dark-brown coloured melt.

Example 2

1 gram aluminium trichloride in 10 ml. diethyl ether was added to 300 ml. of a crude suspension of polypropylene in petroleum ether obtained by polymerising propylene in the presence of the reaction product of titanium trichloride and aluminium triethyl. The suspension had been stored for some time and the original lilac colour of the freshly made suspension had partly discharged presumably due to contact with a limited amount of air.

The suspension was now heated at 75° C. for 30 minutes, 20 ml. 3,5,5-trimethylhexanol-1 then added and the temperature maintained at 75° C. for a further hour although the lilac colour of the suspension was completely discharged after 25 minutes. The resulting grey-white slurry was filtered under nitrogen and washed thoroughly with 1 litre petroleum ether (boiling range 60° C. to 80° C.) under reflux.

About 25 grams polypropylene were obtained having an ash content of 0.09% and melting to a clear straw-coloured melt.

Example 3

Propylene was polymerised in the presence of the product obtained by mixing titanium trichloride and aluminium triethyl using petroleum ether (boiling range 80°–100° C.) as a solvent. A slurry of solid polypropylene in the solvent was obtained. The polymer after separation from the solvent, washing with fresh solvent and drying had an ash content of 0.3%.

The following experiments were carried out using in each experiment 250 ml. of the slurry of polypropylene which contained 25 grams insoluble polymer. Ethyl aluminium sesquichloride as a 0.5 molar solution in methylcyclohexane was added to the slurry which was then stirred and heated at 75° C. (Experiment 8, 65° C.) for 30 minutes. Nonanol i.e. 3,5,5-trimethylhexanol-1 was then added and stirring continued at 75° C. for 1 hour. This treatment discharged the original lilac colour of the slurry which was then filtered and washed 4 times with 150 ml. petroleum ether. Water containing a small quantity of a wetting agent was added to the solid polymer and residual petrol removed by steam distillation. After washing with water and drying in vacuo at 60° C. the ash content was determined and a moulding prepared by pressing at 190° C.

The following table records the amounts of ethyl aluminium sesquichloride and nonanol used, the ash content of the treated polymer and the colour of the moulding.

| Expt. No. | Percent of insoluble polymer | | Percent ash | Colour of moulding |
|---|---|---|---|---|
| | Ethyl aluminium sesquichloride | Nonanol | | |
| 1 | 1.4 | 22 | 0.03 | Off-white. |
| 2 | 2.0 | 50 | 0.07 | Do. |
| 3 | 2.3 | 19 | 0.04 | Do. |
| 4 | 2.8 | 24 | 0.02 | Water white. |
| 5 | 2.7 | 31 | 0.01 | Do. |
| 6 | 2.7 | 31 | <0.01 | Do. |
| 7 | 3.2 | 57 | 0.01 | Do. |
| 8 | 3.4 | 57 | 0.09 | Pale yellow. |
| 9 | 6.0 | 48 | 0.02 | Water white. |

NOTE.—Experiment 8—the treatment was carried out at 65° C. Experiment 6—the slurry of polypropylene produced by the polymerisation process was filtered and reslurried with fresh petroleum ether.

Example 4

The following results were obtained by the process described in Example 3 in which the ethyl aluminium sesquichloride was replaced by aluminium bromide.

| Temp. | Percent of insoluble polymer | | Percent ash | Colour of moulding |
|---|---|---|---|---|
| | Aluminium bromide | Nonanol | | |
| 65° C. | 2.4 | 67.5 | 0.13 | Pale brown. |
| 75° C. | 2.9 | 71 | 0.03 | Water white. |

Example 5

The process described in Example 3 was repeated using isodecanol (2-methyl nonanol) instead of nonanol. The following result was obtained:

| Temp. | Percent of insoluble polymer | | Percent ash | Colour of moulding |
|---|---|---|---|---|
| | Ethyl aluminium sesquichloride | Isodecanol | | |
| 75° C. | 2.4 | 20 | 0.05 | Off-white. |

I claim:
1. A process for removing metal-containing catalyst residues consisting essentially of mixtures of a trivalent titanium compound with an aluminium alkyl compound from solid polymers of unsaturated hydrocarbons which process consists essentially in treating said solid polymers with a higher monohydroxy alcohol selected from the class consisting of 3,5,5-trimethyl hexanol and isodecanol in the presence of a hydrocarbon solvent, and thereafter separating and recovering the solid polymers from the solvent.

2. A process as claimed in claim 1 in which the higher alcohol is 3,5,5-trimethyl-hexanol-1.

3. A process as claimed in claim 1 carried out in the absence of air.

4. A process as claimed in claim 1 in which the solvent is a paraffinic hydrocarbon.

5. A process as claimed in claim 1 in which the amount of the higher alcohol used is within the range 15% to 50% by weight of the polymer insoluble in the solvent.

6. A process as claimed in claim 1 in which the solid polymer after treatment with the alcohol and separation from the liquid phase is washed with a hydrocarbon.

7. A process as claimed in claim 1 in which the polymer is finally treated with steam.

8. A process as claimed in claim 1 in which the temperature is at least 70° C.

9. A process as claimed in claim 1 in which a halide selected from the group consisting of aluminium halides and aluminium alkyl halides is present during the treatment with the higher alcohol.

10. A process as claimed in claim 9 in which the halide is soluble in the solvent.

11. A process as claimed in claim 10 in which the amount of the halide is within the range 2.5% to 5% by weight of the polymer insoluble in the solvent.

12. A process as claimed in claim 9 in which the halide is added to the polymer and solvent prior to the addition of the higher alcohol.

13. A process as claimed in claim 1 in which the solid polymer is polyethylene.

14. A process as claimed in claim 1 in which the solid polymer is polypropylene.

15. A process for removing metal-containing catalyst residues consisting essentially of mixtures of a trivalent titanium compound with an aluminium alkyl compound from solid polymers of unsaturated hydrocarbons which process consists essentially in treating the polymer in the presence of a hydrocarbon solvent at a temperature of at least 70° C. with an alcohol selected from the group consisting of 3,5,5-hexanol and isodecanol at an amount within the range 15% to 50% by weight of the polymer insoluble in said hydrocarbon solvent, and thereafter separating the solid polymer from said hydrocarbon solvent and recovering solid polymer from fresh hydrocarbon solvent.

16. A process as claimed in claim 15 in which a halide selected from the group consisting of aluminium halides and aluminium alkyl halides is added to the mixture of polymer and hydrocarbon prior to the treatment with the alcohol.

References Cited in the file of this patent

UNITED STATES PATENTS

| | | |
|---|---|---|
| 2,827,447 | Nowlin et al. | Mar. 18, 1958 |
| 2,845,412 | Heyson | July 29, 1958 |
| 2,886,561 | Reynolds et al. | May 12, 1959 |
| 2,940,963 | Denkowski | June 14, 1960 |

FOREIGN PATENTS

| | | |
|---|---|---|
| 1,136,709 | France | Dec. 26, 1956 |
| 784,314 | Great Britain | Oct. 23, 1957 |